United States Patent

Watkins et al.

[15] 3,700,931

[45] Oct. 24, 1972

[54] SHIFT REGISTER CLOCKING AT HIGH SPEEDS WHERE PARALLEL OPERATION IS NEEDED

[72] Inventors: Phillip L. Watkins, Rockville, Md.; Raymond W. Cox, Alexandria, Va.

[73] Assignee: The United States of America as represented by the Secretary of the Navy

[22] Filed: Nov. 24, 1971

[21] Appl. No.: 201,787

[52] U.S. Cl................328/63, 340/172.5, 307/221 R

[51] Int. Cl................H03k 3/04

[58] Field of Search......307/208, 221, 223, 225, 269; 328/37, 38, 59, 60, 62, 63; 340/172.5

[56] References Cited

UNITED STATES PATENTS

| | | | |
|---|---|---|---|
| 3,051,929 | 8/1962 | Smith | 340/172.5 |
| 3,135,947 | 6/1964 | Grondin | 340/172.5 |
| 3,274,556 | 9/1966 | Paul | 340/172.5 |
| 3,500,215 | 3/1970 | Lewthold | 328/63 |
| 3,594,656 | 7/1971 | Tsukamoto | 328/63 |
| 3,619,661 | 11/1971 | Butler | 328/63 |

*Primary Examiner*—John S. Heyman
*Assistant Examiner*—R. E. Hart
*Attorney*—R. S. Sciascia et al.

[57] ABSTRACT

A system for clocking a plurality of shift registers in parallel at shift rates up to 10 MHz which employs a single high speed master clock to provide a signal to individual clock drivers. Thus improving the isolation of the master clock and providing a two phase clock needed to drive the individual shift registers. The shift registers to be driven and the driving circuits being mounted in close proximity to each other.

3 Claims, 4 Drawing Figures

SHIFT REGISTER CLOCKING AT HIGH SPEEDS WHERE PARALLEL OPERATION IS NEEDED

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The prior art systems for driving a plurality of shift registers have employed clock drivers to prevent loading of the master clock. These drivers are usually wired into a system at some point which is remote to the location of the shift register to be driven by the respective clock driver. In systems where the shift register packages are mounted on printed circuit packages it is common to mount the clock drivers on separate printed circuit boards and connect the respective printed circuit boards by system wiring, to retain system flexibility.

It has been found that there is an upper limit in shift rate which can be achieved by designing a system in this manner. Further with the advent of LSI (large scale integrated) circuits which require a two phase clock and are capable of 10 MHz operation, it has been found that very sharp rise times are necessary but not achievable where the clock driver is wired at a location remote from that of the shift register. Also without the use of clock drivers the master clock is not isolated from the shift registers. Because of different clock propagation times to remote locations, reflected transient spikes which may be picked up in the circuit wiring cause instability in system operation. Thus the need to minimize system wire length is indicated.

SUMMARY OF THE INVENTION

Thus it has been found, that if the clock driver for each shift register is located on the same printed circuit board as the respective shift register and as close to the clocking terminals of the register as possible shift rates of 10 MHz can be achieved with reliability in shift timing. The master clock then may be a single phase clock which is split by the clock drivers to provide the two phase clock required to drive the shift register.

STATEMENT OF OBJECTS OF THE INVENTION

It is, therefore, an object of the invention to provide an improved shift register storage system.

Another object is the provision of a clock driver mounted in close proximity with each shift register.

Yet another object is the greatly increased shift rate which may be achieved by the use of clock drivers mounted in close proximity with the shift registers.

A still further object of this invention is the use of a single phase master clock which drives a plurality of clock drivers which supply a two phase clock to shift the shift registers.

DESCRIPTION OF THE PREFERRED EMBODIMENT

Figure 4:
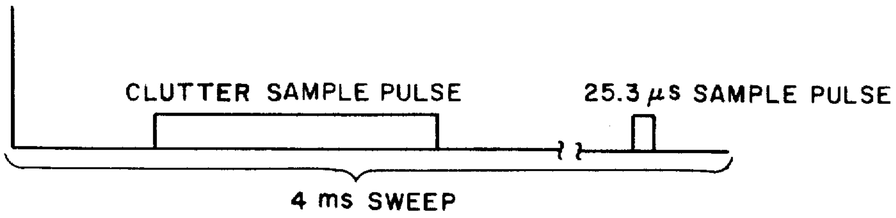

Many types of systems, including radars, are employing digital processing techniques in the reduction of analog signals to usable or more usable output signals. One such technique is described, herein, for improving target to background clutter definition in radars. The technique employed samples, small portions of the radar return at a selected range where there is believed to be a target of interest, see FIG. 4. This return is then integrated over a number of samples, say from 100 to 1000 sweeps depending on the radar PRF. By this process the surrounding clutter return tends to average toward zero because of the clutters random nature while the target return tends to increase. By comparing this integrated signal with a broad sample of the clutter return in an auto detector the target is detected for other system use.

Figure 1:
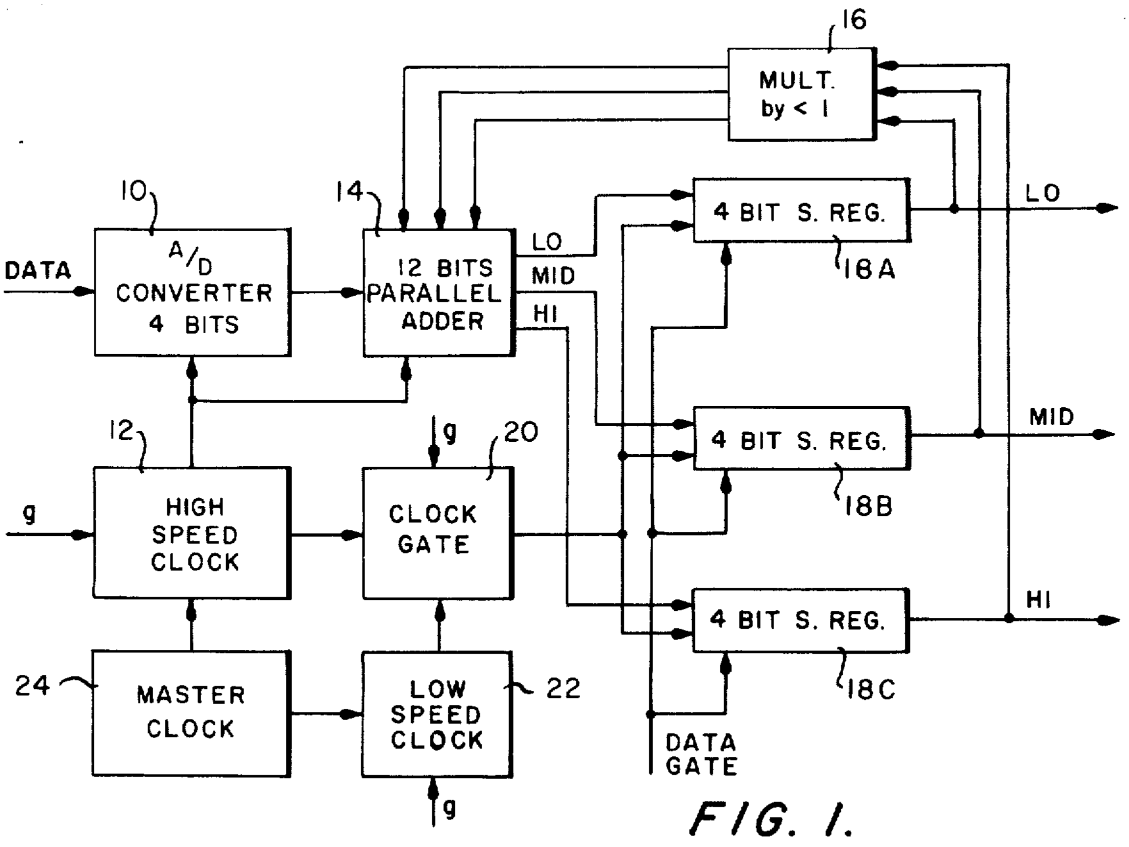
FIG. 1 shows a portion of a radar system for integrating received target data.

FIG. 1 shows the above described integrating portion of such a radar system. Analog data is received and analog to digital converted in A/D converter 10 to a 4 bit digital sample at the rate of 10 MHz during the sample period controlled by high speed clock 12. The sample period employed is 25.3$\mu s$ thus allowing for 253 portions of data of the target area return to be taken and fed to the integration portion of the circuit. The A/D converted data ($4 \times 253$ in size) for each sample is fed to an adder 14 where the output of multiplier 16 is added to the incoming sample. The added sample is then fed to a $4 \times 253$ shift register 18A, B and C which stores the sample. The shift registers, at the start of the sampling process, contain all zeros, thus when the first sample is fed in there is nothing to add to the sample from the multiplier 16. Successive samples are then added to the previous stored sample multiplied by a number less than 1. This achieves an integrating effect which would slowly decay to zero should only zero samples be entered after a nonzero sample. Thus as the samples are fed in the A/D converter 10 converts them into 4 bit digital words with 253 words per sample. These words are totalized by the 12 bit adder 14 and fed to the shift registers 18A, B and C which receive Lo, Mid and Hi bits of the expanded 12 bit word in parallel. On successive samples the Lo, Mid and Hi outputs are fed in parallel through multiplier 16 and added to the incoming 4 bit word. As previously explained this causes an integrating effect thus emphasizing the target and deemphasizing the surrounding clutter. At the end of the integrating period, (all needed samples being taken, say in 100 sweeps with samples of 25.3$\mu s$ in each) the clock gate 20 switches in the low speed clock 22 (like the high speed clock controlled by master 24) which shifts out the integrated data at a word rate compatible with the further processing equipment, about 100 KHz, where the integrated word is compared with a selected sample of clutter in an auto detector, not shown. As the data is shifted out the data gate to the shift registers is held to zero thus resetting the registers 18A, B and C to zero.

What is described herein is a single loop integrator comprising the adder 14, shift register 18 and multiplier 16 which covers one 25.3$\mu s$ range segment. A typical system would contain multiple integrator loops where the high speed clock source 12 emits separate time-spaced bursts of 253 clock pulses to each loop to cover several range segments during each PRF sweep.

Each shift register 18A, B and C comprises 4 large scale integrated (LSI) circuit shift registers along with clock drivers and logic input circuitry all on one printed circuit board. Prior to the invention clock drivers were placed remote to the circuits to be driven. The result was an inability to achieve the rated shift rate of 10 MHz for the LSI shift register due to clock noise effect.

CLOCK NOISE EFFECT

The two phase clock input to the LSI shift register requires sharp rise and fall times to achieve the maximum shift rate of 10 MHz. Both positive and negative going transitions of each clock phase are used to complete the data shift operation. Hence four clock transitions are required totally, note FIG. 3. Also the loading effect on the clock source by the shift register is high. These two requirements of fast rise time and low source impedance for the clock driver present a problem when operating a large number of shift register channels in a system, since each shift register requires a separate clock driver. With a large number of low impedance clock drivers, packaged separately from the shift registers, operating in parallel, each with four transitions and with inherent differential delays, transient spikes are generated which are readily picked up in the circuit wiring. This clock noise appeared as cross talk on to the signal and power lines causing data errors and instability in shift timing.

It was these factors which led to the placement of the clock driver circuits on the same PC board with the shift register and near the shift register clock terminals. By this arrangement only a single phase low level clock driving source is required external to the shift register board, since the loading effect is reduced by locating the high power clock driver circuit on the shift register card. Also, the cross talk of the clock transitions on to the other lines is eliminated because the clock driver is isolated from the inter-circuit wiring between the cards by the input buffer circuit. The result is less chance for errors caused by clock noise on the data lines and less chance for jitter and instability in the clock timing between channels. Also higher system operating speed is obtained because of the uniformity in the clock signal paths between channels.

Figure 3:
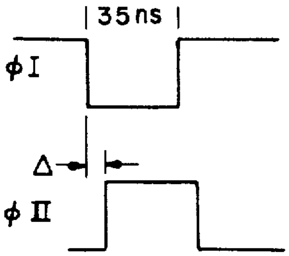
FIGS. 3 and 4 show clocking and sampling diagrams.
Figure 2:
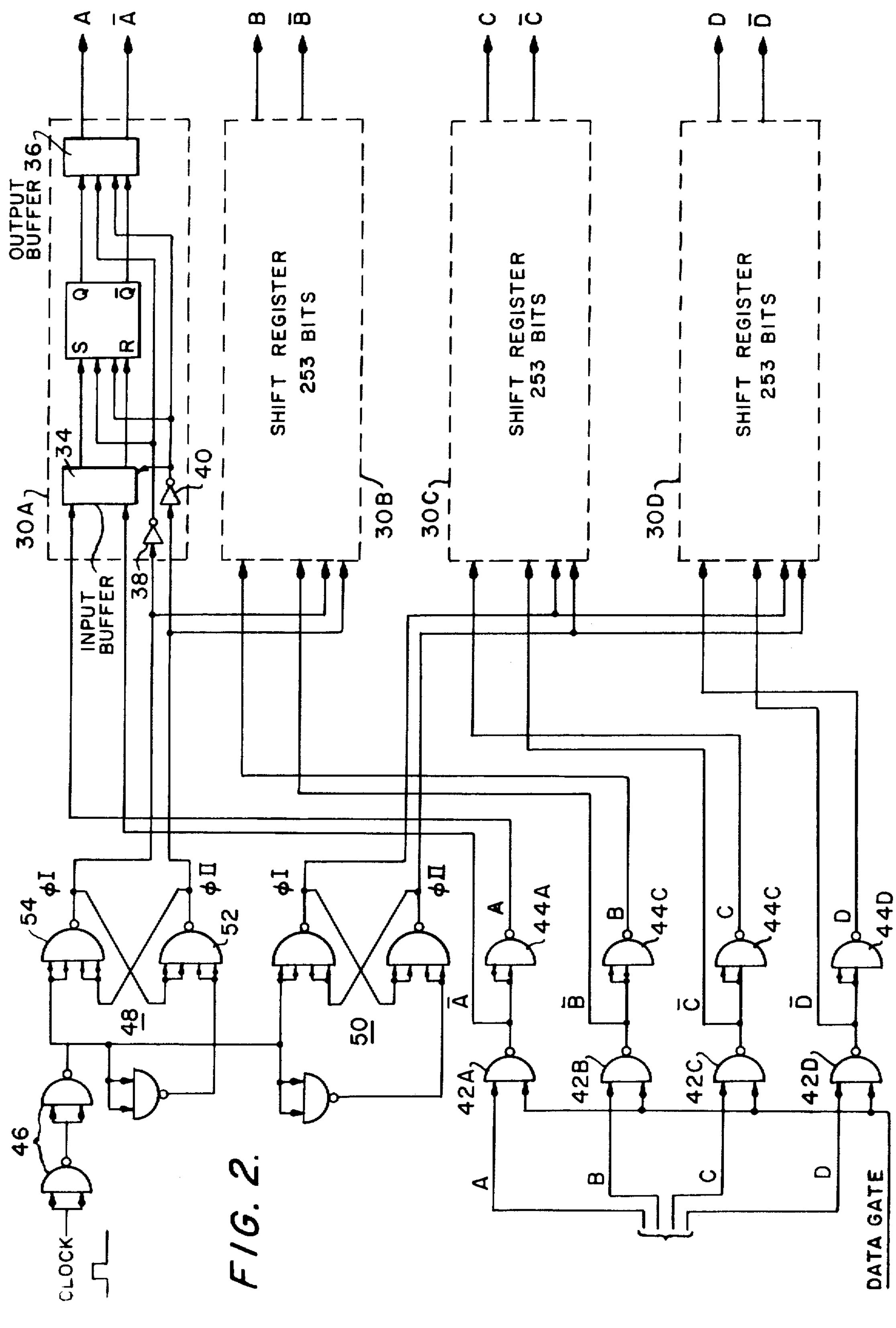
FIG. 2 shows the shift registers, clock drivers and input logic of one printed circuit board.

FIG. 2, shows the logic circuitry of the individual printed circuit boards each of which comprises one 4 bit shift register 18. The LSI shift registers 30A, B, C, and D are identical units normally packaged two in each package (i.e., A and B in one unit). Shift register 30A is shown in schematic form as a single register 32, for purposes of discussion, having an input buffer 34, an output buffer 36 and clock inverters 38 and 40. The register 32 comprises a series of master-slave flip flops which require complementary data and a two phase clock for proper operation. The data is supplied on four channels A, B, C and D from the adder 12 to data gates 42A, B, C and D. The data gates invert the data and are used to reset the shift registers 30A, B, C and D. The inverted data $\overline{A}$, $\overline{B}$, $\overline{C}$ and $\overline{D}$ is supplied to each shift register while the data is again inverted by inverters 44A, B, C, and D also coupled to each shift register. A single phase clock pulse is fed to buffers 46 to isolate the master clock and supply positive going pulses to latches 48 and 50 which supply a two phase clock see FIG. 3. Normally a latch circuit is described as simultaneously switching its outputs, but in reality $\phi$II is delayed by the propagation time of gate 52 which cannot switch until gate 54 has switched. Thus with a clock pulse of 35$\mu$s and a propagation time of 7$\mu$s $\phi$II is delayed as shown in FIG. 3 thus the two phase clock with four transitions needed to operate the shift registers 30A and B is generated. Latch 50 supplies the clock for 30C and D. The operation of each shift register 18 is clear from the previous discussion. It was found that due to the drive needed for each LSI circuit that a clock driver was needed and that driver must be in a very close proximity to the LSI shift register to obtain the rated shift rate. It is even more important to keep clock noise spikes isolated from the system wiring when operating with multiple integrator loops. Cross-talk between the clock lines to each loop would cause inadvertent shifting of data out of the registers and consequent loss of data.

It is therefore to be understood that within the scope of the appended claims, the invention may be practiced otherwise than as specifically described.

What is claimed and desired to be secured by letters patent of the United States is:

1. A digital integrator comprising:
 a plurality of shift registers being connected so as to operate in parallel;
 a master clock being connected to drive a high speed clock and a low speed clock;
 said high speed clock and said low speed clock being gated to supply a single phase clock signal to control said plurality of shift registers wherein said high speed clock is gated to said plurality of shift registers to the exclusion of said low speed clock while when said low speed clock is gated to said plurality of shift registers said high speed clock is blocked;
 a data line being connected to said plurality of shift registers for supplying parallel data to said plurality of shift registers;
 a data gate being connected to each of said plurality of shift registers for gating in data and for resetting said plurality of shift registers;
 each of said plurality of shift registers having an output;
 each of said plurality of shift registers comprising a plurality of high speed shift registers connected to operate in parallel each of said high speed shift registers having an output, a first input, a second input complementary to said first input, a first phase clock input, and a second phase clock input;
 a plurality of clock means for receiving said single phase clock signal and for generating a first phase clock signal and a second phase clock signal which are approximately complementary in phase;
 said first and second clock signals being connected to said first and second phase clock inputs respectively;
 said clock means being located relative to said high speed shift registers to minimize cross talk data means connected to said data line for receiving said parallel data and for complementing said parallel data;
 said data means being coupled in parallel to said plurality of high speed shift registers first and second inputs.

2. The apparatus of claim 1 wherein:

said plurality of shift registers are capable of operating at shift rates up to 10 MHz.

3. The apparatus of claim 2 wherein:

said clock means is located relative to said high speed shift registers to minimize cross talk on the same printed circuit board.

* * * * *